Feb. 26, 1935. W. F. SKEATS 1,992,780
ELECTRIC INDICATING AND RECORDING INSTRUMENT
Filed Nov. 27, 1931
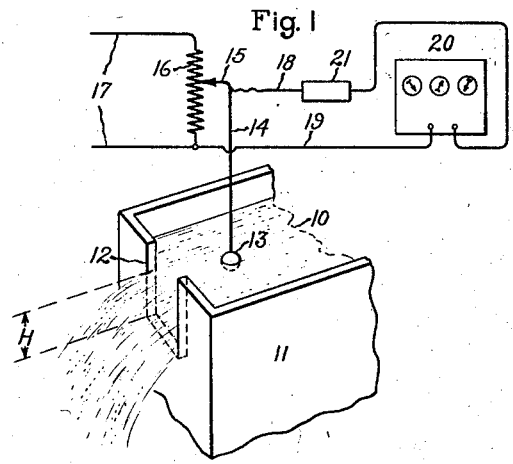
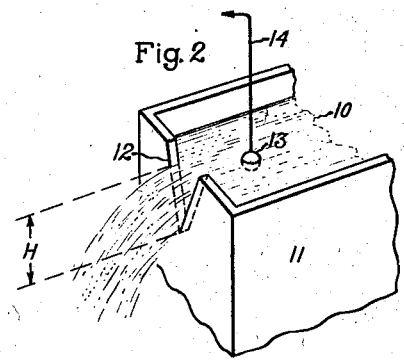
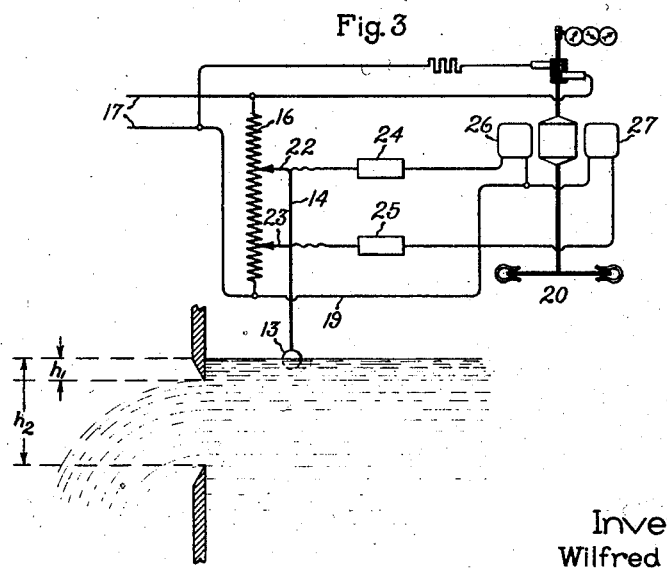
Inventor:
Wilfred F. Skeats,
by *Charles E. Tullar*
His Attorney.

Patented Feb. 26, 1935

1,992,780

UNITED STATES PATENT OFFICE 1,992,780

ELECTRIC INDICATING AND RECORDING INSTRUMENT

Wilfred F. Skeats, Scotia, N. Y., assignor to General Electric Company, a corporation of New York Application November 27, 1931, Serial No. 577,448

7 Claims. (Cl. 177—351)

My invention relates to measuring and calculating instruments, in particular to such devices in which the result is obtained electrically.

An object of my invention is to determine the value of an unknown quantity which does not vary directly but as a power of a known or measurable quantity, whether said power be an integer or not.

Another object of my invention is to make it possible to integrate an unknown variable quantity by providing a device which will indicate the instantaneous values of said unknown quantity in response to another quantity bearing a radical relationship thereto when it is inconvenient or impossible to provide an integrating mechanism directly responsive to the unknown quantity.

A further object is to provide a device for indicating or integrating the flow of liquid through hydraulic discharge devices in response to indications of hydraulic head where the discharge varies as an odd power of the head. Other objects will become apparent as the description proceeds.

In carrying out my invention, I arrange an electrical circuit so that the voltage therein is varied by suitable potential regulating means in accordance with variations in an observable quantity. In the electrical circuit, is inserted a resistor or a mass of resistance material having a hyperbolic resistance ampere characteristic so that the current flowing in the circuit does not vary directly as the voltage applied but varies as some power of the voltage which may either be an integer or an odd power. Suitably calibrated electrical indicating or integrating means are also included in the electrical circuit depending upon whether the instrument is to be used as an indicating or integrating device.

The features which I believe to be novel and patentable are pointed out in the claims appended hereto.

For a more complete understanding of my invention reference may be had to the accompanying drawing in which Fig. 1 represents the application of the principle of my invention to a meter for measuring the flow of water across a weir and in which Figs. 2 and 3 represent modifications of the flow meter shown in Fig. 1.

In the arrangement illustrated in Fig. 1 the body of water 10 flows from a tank 11 through a weir 12 with a head H measured by the vertical distance from the bottom of the weir 12 to the level of the water 10 in the tank 11. The float 13 transmits variations in the level of the water in the tank 11 by means of a member 14 to a sliding contact 15 of a potentiometer 16 connected to a source of constant potential 17 so that the voltage across the leads 18 and 19 is proportional to the head H of the water flowing over the weir 12. The leads 18 and 19 are connected to a circuit comprising the current integrating meter 20 and a resistor 21.

The resistor 21 is composed of a material forming no part of my invention which has a hyperbolic resistance ampere characteristic, that is to say, this material satisfies the equation $$RI^a = C$$

where R represents the resistance in ohms, I represents current flowing through the resistor, C is a constant and $a$ is the slope of the curve representing said equation when plotted with respect to logarithmic coordinates. By Ohm's law we may write $$R = \frac{E}{I},$$

where E represents the voltage across the terminals of the resistor and R and I represent the same values as in the previous equation. Substituting this value of R in the first equation, we obtain the equation $$I = \left(\frac{E}{C}\right)^{\frac{1}{1-a}}$$

which may be written $$I = K \times E^{\left(\frac{1}{1-a}\right)}$$

in which K is another constant.

If a value of .333 is chosen for "$a$" the last mentioned equation becomes $$I = K \times E^{\frac{3}{2}}$$

but the rate of discharge of water from a rectangular weir is $$Q = K_1 \times H^{\frac{3}{2}}$$

where $K_1$ is a constant which depends upon the dimensions of the weir.

Accordingly the current I flowing through resistor 21 is proportional to the discharge Q of the weir 12. A current responsive device which is in series with the resistor 21 may therefore be calibrated directly in terms of discharge of the weir 12.

The value of the exponent "$a$" determining the relationship between the resistance of the material forming resistor 21 and the current flowing therethrough may be controlled in the process of manufacture by a method which forms no part of the present invention but which will be explained briefly hereinafter.

In Fig. 2 I have illustrated a V-notch weir in which the discharge is given by the equation $$Q = K_2 H^{\frac{5}{2}}$$

where $K_2$ is a constant depending upon the dimensions of the weir. By suitably controlling the value of the exponent "$a$" of the material of resistor 21, I may make the current flowing in the circuit shown in Fig. 1 proportional to the 5/2 power of the applied voltage and accordingly the current flowing in the circuit will represent the discharge from a V-notch weir. It will be understood that the resistance of resistor 21 is made sufficiently large so that the effects of the resistance of the leads and the other parts of the electrical circuit will be negligible.

In Fig. 3 I have represented the application of my invention to the measurement of the total flow through a low head rectangular orifice in which the discharge is given by the equation $$Q = K_3 \left( h_2^{\frac{3}{2}} - h_1^{\frac{3}{2}} \right)$$

where $K_3$ is again a constant depending upon the dimensions of the orifice, $h_1$ is the height of the water level above the top edge of the rectangular orifice and $h_2$ is the height of the water level above the bottom edge of the rectangular orifice. In this modification, I provide a potentiometer 16 with two sliding contacts 22 and 23 attached to the member 14 which is in turn attached to the float 13 so that the voltages from the common return wire 19 to the contacts 22 and 23 are proportional to the heads $h_2$ and $h_1$ respectively. Sliding contacts 22 and 23 are connected in branch circuits containing the resistors 24 and 25 and the current coils of the integrating electric meter 20. The resistors 24 and 25 are composed of material having a hyperbolic resistance ampere characteristic in which the exponent "$a$" equals .333. The current coils 26 and 27 of the integrating meter 20 are connected in opposition so that the reading of the meter 20 is proportional to the difference in the 3/2 powers of the heads $h_2$ and $h_1$. Accordingly, the reading of the meter 20 is proportional to the total amount of water discharged by the rectangular orifice and the meter 20 may be calibrated directly in units of quantity of water.

It will be understood that although I have illustrated the application of the principle of my invention to hydraulic meters it is not limited thereto but includes any device in which the final quantity indicated or recorded varies as some odd or integral power of another quantity.

For the resistor 21 I may employ a material of the type disclosed in Letters Patent of the United States to Karl B. McEachron, assigned to General Electric Company, No. 1,822,742, granted September 8, 1931, for Discharge device and resistance material. The material employed is preferably a mixture of silicon carbide and carbon with a suitable binder or silicon carbide mixed with other conducting materials such as tungsten, molybdenum and the like; but it will be understood that any suitable material having a hyperbolic resistance ampere characteristic may be employed. Exponent "$a$" which expresses the relationship between the resistance of the material and the current flowing therethrough may be controlled by controlling the free carbon ingredient by firing the material, by controlling the grain size, or by varying the binder as explained in the above mentioned patent.

I find that a material of a composition suitable for use with rectangular weirs or other devices following the same exponential relationship may the made as follows: For convenience I take carborundum having a percentage of free carbon of less than 4% and of a grain size which passes through a sieve mesh of the order of 250 openings per square inch which for convenience I will designate as grains of standard size. This granular carborundum is then mixed with a binder. This binder is preferably ball clay of the pencil clay variety. The grain size of the clay is preferably the same as that of the carborundum. The proportions of the ingredients are as follows: Equal parts of clay and carborundum and sufficient free carbon in the form of graphite to bring the total free carbon content of the mixture to 8½%. These ingredients are thoroughly mixed together. Water is then added and the ingredients are again thoroughly mixed. The amount of water added for this wet mixture is preferably about 70% by weight of the dry ingredients. After the wet mixture has been thus prepared it is spread out in pans to dry. The drying process can be carried out in any suitable manner as for example by heating or by passing a current of air over the material by means of a blower. The heating may be done by placing the material in an oven at a temperature raised to about 140° C.

After the material is dried, it is broken up so as to allow it to pass through a twenty mesh screen after which water is added again, the amount of water now being about 3% by weight of the solid material and mixed again until uniformly damp. This product is now molded to unit under a pressure of from 14,000 to 18,000 pounds per square inch. After the units are thus formed they are dried for about five days by allowing them to stand in the open. They are then fired at about 900° C. in a reducing or neutral atmosphere and allowed to cool. This entire operation may require six hours more or less.

The units at the end of this time are heated in an oven in a reducing or a neutral atmosphere as for example in an electrical furnace at a temperature of about 1300° C. for about an hour.

The units into which the product is pressed may be of any suitable shape, but I preferably employ the material in the form of flat disks in which the current passes from one face to the other. In making the resistor 21, one or several disks or units may be used.

In order to provide a good electrical contact between the disks or between the surfaces of the disk and the rest of the electrical circuit, each of the disks or units after the process above described may be coated with metal as for example by some suitable spraying process.

In preparing a material for the resistor 21 to be used in connection with a recording V-notch weir or other device in which the unknown quantity varies as the 5/2 power of the known quantity I may follow a similar procedure to that just outlined with the exception that the free carbon content is decreased to about 6.5%. It will be understood that my invention is not limited to the examples given but that by suitably varying the carbon content the exponential relationship between the current forced through the resistance 21 and the voltage applied may be varied so as to provide resistance material suitable for other types of measuring or calculating instruments in which one quantity varies as a power of another quantity, whether said power be a fraction, a whole number or an improper fraction.

While I have described my invention as embodied in concrete form and as operating in a specific manner in accordance with the provisions of the patent statutes, it should be understood that I do not limit my invention thereto since various modifications thereof will suggest themselves to those skilled in the art departing from the spirit of my invention the scope of which is set forth in the annexed claims.

What I claim as new and desire to secure by Letters Patent of the United States, is:—

1. In combination with a hydraulic discharge device an electric circuit and means for varying the voltage thereof in accordance with variations in hydraulic heads, said electric circuit including current responsive means and a resistor composed of a material having a resistance ampere characteristic such that the current varies substantially as the 3/2 power of the voltage.

2. In combination with a hydraulic discharge device an electric circuit and means for varying the voltage thereof in accordance with variations in hydraulic head, said electric circuit including current responsive means and a resistor composed of a material having a resistance ampere characteristic such that the current varies with voltage substantially as the hydraulic discharge varies with the head.

3. In combination with a measuring device in which the measured quantity varies as an odd power of the observed quantity, an electric circuit and means for varying the voltage thereof in accordance with the magnitude of the observable quantity said electrical circuit including current responsive means and a resistor composed of a material having a resistance ampere characteristic such that current varies with the voltage substantially as the measured quantity varies with the observable quantity.

4. Means for obtaining an indication which varies as a predetermined power of a given quantity, comprising an electrical circuit and means for varying the voltage thereof in accordance with the magnitude of the given quantity, said electrical circuit including current responsive means and a resistor composed of a material having a resistance ampere characteristic expressed by the equation $RI^a = C$; where R is the resistance of said resistor, I is the current flowing therein, C is a constant and $a$ is the slope of the curve represented by said equation when plotted with respect to logarithmic coordinates.

5. Means for integrating quantities with respect to time which vary in magnitude in accordance with a power of an observable quantity, comprising an electrical circuit and means for varying the voltage thereof in accordance with the variation of said observable quantity, said electrical circuit including current integrating means and a resistor composed of a material having resistance ampere characteristics such that the current in said circuit varies with respect to the voltage substantially as said quantity to be integrated varies with respect to said observable quantity.

6. Means for obtaining an indication which varies as a predetermined power of a given quantity, comprising an electrical circuit and means for varying the voltage thereof in accordance with the magnitude of the given quantity, said electrical circuit including current responsive means and a resistor including silicon-carbide and free carbon in its composition, so that the current flowing will vary with the applied voltage substantially as said predetermined power.

7. In combination with a measuring device in which the measured quantity varies as the difference of two quantities which are predetermined powers of observable quantities, electrical circuits each responsive to one of said observable quantities, means for varying the voltages thereof in accordance with the magnitudes of the associated observable quantities respectively and differential current responsive means having opposed elements, each of said electrical circuits including an element of said current responsive means and a resistor composed of a material having a resistance ampere characteristic such that the current in each circuit varies with the voltage substantially as said predetermined power of the observable quantity to which said circuit is responsive.

WILFRED F. SKEATS.